United States Patent
Scott et al.

(10) Patent No.: US 9,075,492 B1
(45) Date of Patent: Jul. 7, 2015

(54) METHOD AND SYSTEM FOR DISPLAYING ITEMS

(75) Inventors: Sean M. Scott, Sammamish, WA (US); Douglas J. Gradt, Seattle, WA (US); Doug Irvine, Seattle, WA (US); Nimrod Hoofien, Seattle, WA (US); Eva Manolis, Bellevue, WA (US); Christopher J. Vigder, Mercer Island, WA (US); Amy Bates, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1815 days.

(21) Appl. No.: 11/694,726

(22) Filed: Mar. 30, 2007

(51) Int. Cl.
 *G06F 3/048* (2013.01)

(52) U.S. Cl.
 CPC ...... *G06F 3/048* (2013.01); *G06F 2203/04805* (2013.01)

(58) Field of Classification Search
 CPC .............. G06F 2203/04805; G06F 2203/04806
 USPC .......... 715/800, 804, 962, 781, 801; 345/660, 345/666
 See application file for complete search history.

(56) References Cited

U.S. PATENT DOCUMENTS

| | | | |
|---|---|---|---|
| 5,187,776 A * | 2/1993 | Yanker | 715/800 |
| 5,754,850 A | 5/1998 | Janssen | |
| D395,426 S | 6/1998 | Chiba | |
| D403,313 S | 12/1998 | Peppel | |
| 5,889,517 A | 3/1999 | Ueda et al. | |
| D418,120 S | 12/1999 | Okura et al. | |
| D418,495 S | 1/2000 | Brockel et al. | |
| D427,574 S | 7/2000 | Sawada et al. | |
| 6,101,480 A | 8/2000 | Conmy et al. | |
| 6,268,854 B1 | 7/2001 | Borden et al. | |
| 6,288,702 B1 * | 9/2001 | Tachibana et al. | 345/671 |
| 6,320,602 B1 | 11/2001 | Burkardt et al. | |
| D459,360 S | 6/2002 | Leon et al. | |
| D470,857 S | 2/2003 | Anderson et al. | |
| D474,778 S | 5/2003 | Barnes | |
| 6,678,891 B1 | 1/2004 | Wilcox et al. | |
| 6,798,630 B1 | 9/2004 | Del Vecchio et al. | |
| RE38,609 E | 10/2004 | Chen et al. | |
| D513,511 S | 1/2006 | Decombe | |
| 6,983,420 B1 | 1/2006 | Itou et al. | |
| 7,058,902 B2 | 6/2006 | Iwema et al. | |
| D528,553 S | 9/2006 | Nevill-Manning et al. | |
| D528,556 S | 9/2006 | Decombe | |
| D529,036 S | 9/2006 | Koch et al. | |
| D529,037 S | 9/2006 | Koch et al. | |
| D529,509 S | 10/2006 | Stabb | |

(Continued)

OTHER PUBLICATIONS

Screenshot from the Office for Harmonization in the Internal Market website, (http://oami.europa.eu/RCDOnline/RequestManager) dated Mar. 25, 2008 (2 pages).

(Continued)

*Primary Examiner* — Omar Abdul-Ali
(74) *Attorney, Agent, or Firm* — Athorus, PLLC

(57) ABSTRACT

Methods and systems for selecting and displaying items includes causing the display of a large image of a selected item, a plurality of view icons indicative of different views of the selected item, and item details associated with a selected item. After the customer selects a view and/or color for the large image and mouses over the image, a zoom box appears and a corresponding magnified image window appears with a magnified image of the zoom box image for the selected view and color of the item.

38 Claims, 8 Drawing Sheets

(56) References Cited

U.S. PATENT DOCUMENTS

| | | | |
|---|---|---|---|
| D529,920 S | 10/2006 | Nevill-Manning et al. | |
| D530,336 S | 10/2006 | Thomsen | |
| D534,543 S | 1/2007 | Gusmorino et al. | |
| D541,291 S | 4/2007 | Zhou et al. | |
| D546,336 S | 7/2007 | Vong et al. | |
| D548,743 S | 8/2007 | Takahashi et al. | |
| D554,652 S | 11/2007 | Shen et al. | |
| D554,654 S | 11/2007 | Waldeck | |
| 7,551,187 B2* | 6/2009 | Agrawala et al. | 345/667 |
| 7,580,867 B2* | 8/2009 | Nykamp | 705/26 |
| 7,603,367 B1 | 10/2009 | Kanter et al. | |
| 7,676,759 B2 | 3/2010 | Carter | |
| 7,698,647 B2* | 4/2010 | Steeb et al. | 715/738 |
| 7,882,156 B2 | 2/2011 | Wykes et al. | |
| 2002/0042755 A1 | 4/2002 | Kumar et al. | |
| 2002/0087558 A1 | 7/2002 | Bailey et al. | |
| 2002/0138481 A1 | 9/2002 | Aggarwal et al. | |
| 2003/0046700 A1 | 3/2003 | Wilcox et al. | |
| 2003/0050844 A1 | 3/2003 | Ruppelt et al. | |
| 2003/0090474 A1 | 5/2003 | Schaefer | |
| 2003/0169302 A1 | 9/2003 | Davidsson et al. | |
| 2004/0083239 A1 | 4/2004 | Cookson et al. | |
| 2004/0117271 A1 | 6/2004 | Knight et al. | |
| 2006/0064652 A1 | 3/2006 | Ahokas | |
| 2006/0179027 A1 | 8/2006 | Bechtel et al. | |
| 2006/0184613 A1 | 8/2006 | Stienessen et al. | |
| 2006/0291737 A1* | 12/2006 | Yamada | 382/252 |
| 2006/0291738 A1* | 12/2006 | Gong | 382/254 |
| 2008/0012863 A1* | 1/2008 | Finn et al. | 345/473 |
| 2009/0064018 A1* | 3/2009 | Horvitz et al. | 715/764 |
| 2009/0132943 A1* | 5/2009 | Minsky et al. | 715/767 |

OTHER PUBLICATIONS

Onlineshoes, onlineshoes.com, Jan. 2007.
Girishankar, S., "Build the E-Commerce Catalog—New Content-Management Tools Bring Together Disparate Data Formats and Item Descriptions," InformationWeek, 74, Nov. 1999.
Smith, A., "New Look for Solid Modeling, A," Computer-aided Engineering, vol. 15, No. 4, pp. 19-24, Apr. 1996.
Finnegan, F., "Questions and Answers: Windows," Microsoft Systems Journal, vol. 7, No. 2, p. 103, Mar.-Apr. 1992.
Coates, J., "The Chicago James Coates Computers column," Knight-Ridder Tribune Business News—Chicago Tribune—Illinois, Feb. 20, 2006.

* cited by examiner (a)

(b)

(c)

(d)

(e)

(f)

(g)

(a)

(b)

(c)

METHOD AND SYSTEM FOR DISPLAYING ITEMS

TECHNICAL FIELD

This disclosure relates generally to methods and systems for displaying items and, more particularly, to a method and system for displaying magnified images of items.

BACKGROUND

It is now commonplace for consumers (or customers or shoppers or buyers) to purchase goods or products from client-server based (on-line or e-commerce or Internet-based) retailers (or merchants). A large number of retailers have set up Internet web sites where consumers can shop for the products (or items or goods) that are available for sale, purchase the products desired, and have the products delivered to them. These products may be tangible goods, such as groceries, books, CDs, DVDs, tools, clothes, footwear, health/beauty items, hardware, or any other tangible goods that are physically delivered to the customer, or "digital" goods, such as electronic books, music, movies/videos, application software, or any other digital product that is downloaded, copied, transmitted or otherwise electronically transferred to the customer.

To find a desired item to purchase, the customer may perform a search using the merchant website search tools. The search results are typically displayed as a list of items that are related to the search request. The customer then selects (or clicks on) a desired item in the list, which causes the website to display the item details, including the item specifications, characteristics, features and/or images of the item. After reviewing the item details, the customer purchases the item, e.g., a pair of shoes, and the item is shipped to the customer. However, when the shoes are received by the customer, it becomes clear that the shoes have a buckle that will dig into the customer's sensitive ankle, an aspect that could have been detected by close visual examination of the item prior to purchase. Thus, the customer must return the item to the merchant and select another pair of shoes to purchase. Such an item purchase and return process can be very inefficient and can lead to buyer frustration that may greatly diminish the shopping experience.

Therefore, the current techniques for purchasing certain products on line do not provide the customer with sufficient visual information to ensure the selected item is properly suited for the customer. Accordingly, it would be desirable to have a system or method for assisting shoppers that overcomes the limitations and inefficiencies of the conventional approaches, that, among other potential benefits, provides a more effective way of allowing the customer to ensure the product is the correct product for the customer, prior to purchase, to avoid unnecessary costs, returns and delays, thereby improving the shopping experience with the merchant.

SUMMARY

Systems and methods for displaying items are disclosed. For example, according to one embodiment of the present disclosure, a method includes causing the display of a large image of a view of a selected item, the view corresponding to a selected one of a plurality of view icons; causing the display of a zoom box over at least a portion of the large image in response to a selection of at least a portion of the large image, the portion of the large image within the zoom box being a zoom box image; causing the display of a magnified image of the zoom box image, the magnified image being larger than the zoom box image; and the magnified image being a predetermined portion of a high resolution image.

For example, when Sue is shopping for shoes, a search results list returns twenty shoes displayed on the merchant web page. When Sue clicks on a shoe image in the list, a zoom detail window (or screen) appears, which shows a large image of the shoe, shows several view icons indicative of several different views of the item, and shows item details about the shoe in an adjacent item details section (e.g., price, availability and available colors, sizes, and widths). When Sue mouses over a right side view icon, the large image changes to show the right side view of the shoe. Then, when Sue mouses over the large image, a zoom box appears over that portion of the image, and a magnified image window appears with a magnified image of the image within the zoom box, allowing Sue to see specific aspects of the desired view of the shoe, such as the buckle and the straps. When Sue moves the mouse along the display in the large image view, the zoom box moves with the mouse, providing magnified details of the shoe where the zoom box is located. After viewing magnified images of several different views of the shoe, Sue decides to purchase the shoes, and this product is shipped to her.

The present disclosure provides a method and system for displaying magnified images of user selectable portions of various different views of items to allow a customer to view the item at the level of detail needed to make a purchase. It allows the customer to easily switch from one view to the next by mousing over view icons and then selectively zooming into each view as desired to magnify areas of interest. Also, the disclosure allows the customer to select an available color for the item and view the item in that color as the large image view and also zoom in on desired portions of the color-selected item without having to changes screens. Further, a portion of the item detail screen section may be used for the "zoom" window or section and automatically switches back to the item detail section when the zoom box is not being used. Still further, the size of the zoom box automatically adjusts to the size of a high resolution image from which the magnified image is displayed.

The foregoing and other objects, features and advantages of the present disclosure will become more apparent in light of the following detailed description of exemplary embodiments thereof.

DETAILED DESCRIPTION

Figure 1:
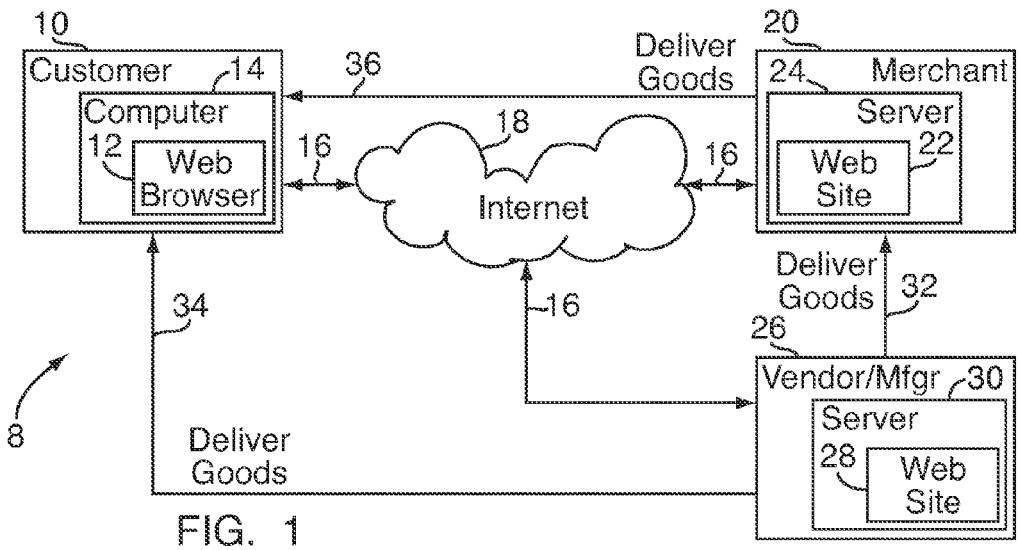
FIG. 1 is a block diagram of the components of a customer-merchant shopping system, in accordance with embodiments of the present disclosure.

FIG. 1 illustrates the principal components of an embodiment of a customer-merchant client-server based ordering system 8, which includes a customer 10 (or consumer or client or shopper or buyer) and an e-commerce or Internet-based merchant (or supplier or retailer or seller or reseller or distributor) 20. The customer 10 can be any entity or individual that wishes to purchase, rent, lease, borrow, or otherwise obtain, goods (or products) or services from the merchant 20. The customer 10 uses a web browser 12 running on a computer 14. The merchant 20 is an entity that sells items from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or Internet applications, such as the web browser 12, or any other web-enabled applications or features including email, or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, and the like. The protocols and components for providing communication between the customer computer 14 and the merchant website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to make purchases, the customer 10 browses through information concerning goods (or products) or services available for purchase from the merchant 20. After selecting one or more product(s) or service(s) (collectively, "items") that the customer 10 wishes to purchase, an order is sent to the merchant 20. The order is placed via a communication from the web browser 12 to the web site 22 operating on the server 24 of the merchant 20, which includes payment by the customer 10 to the merchant 20 for the items. The merchant 20 then delivers the items to the customer 10 as indicated by the line 36. Alternatively, the vendor 26 may deliver the items directly to the customer 10 as indicated by the line 34.

Figure 2:
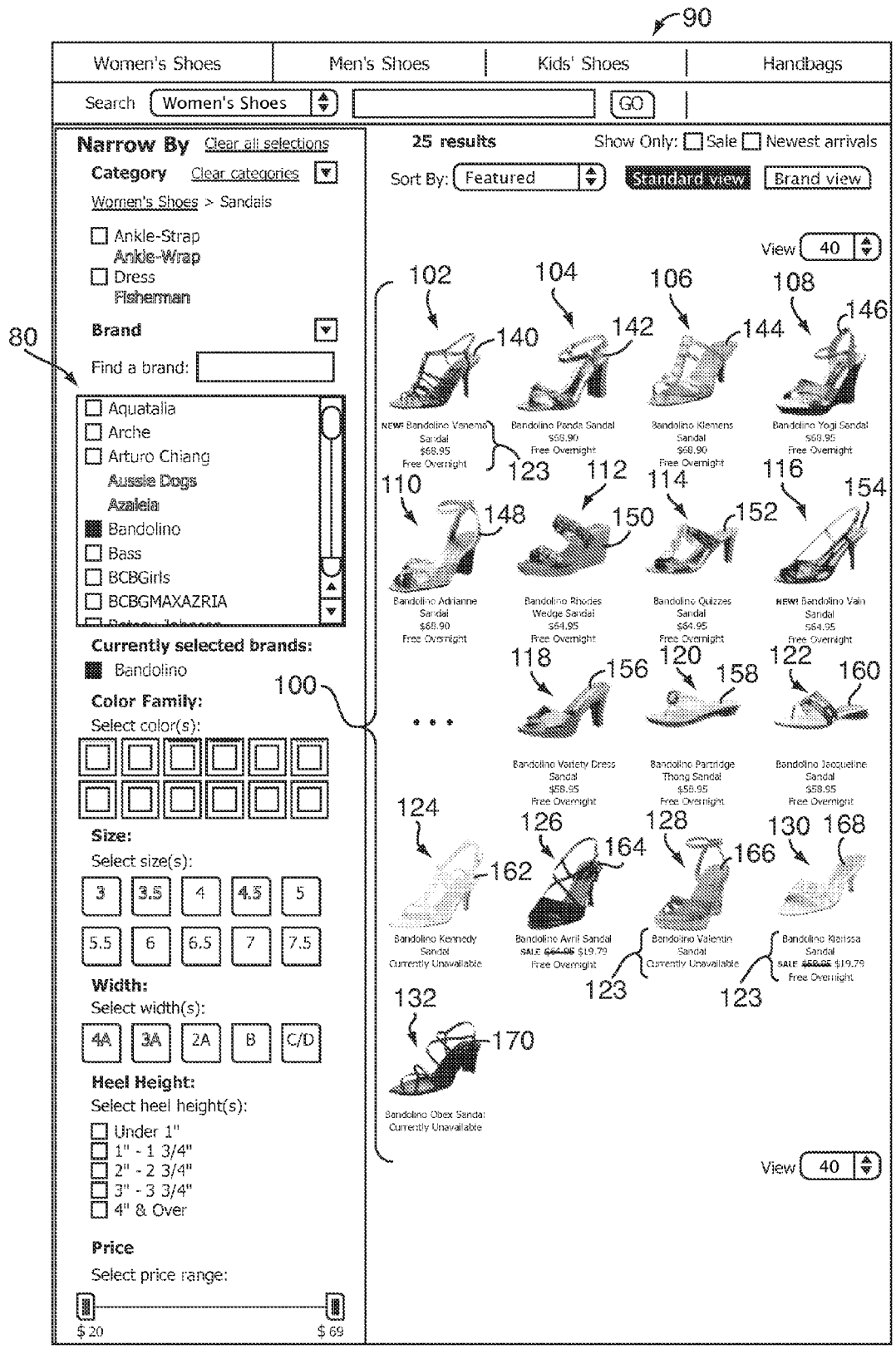
FIG. 2 is a screen illustration of a search results items list, in accordance with embodiments of the present disclosure.

Referring to FIG. 2, a sample merchant website screen 90 (or graphical user interface (GUI) or web page or browser screen) for use by the customer 10 in selecting items for purchase from the merchant 20 via the web site 22, includes a search results list (or group, or set, or collection) 100 of one or more items 102-132. As used herein, the term "list" includes, but is not limited to any list, group, set, or collection of two or more items. The items list 100 may be displayed on one or more separate screens or web pages. The number of screens and the number of items on each screen depends on the format and content of images displayed in the items list 100. Each of the items 102-132 has corresponding unique images 140-170 associated therewith. In addition, there may be a brief description 123 of each item on the list 100, such as the item name, manufacturer, availability (e.g., in stock, out of stock, discontinued, etc.), price, shipping cost, and the like. The sample screen 90 shows search results for women's shoes, and, in particular, women's sandals having the Bandolino brand, and shows a product filter window or section 80 similar to that described in U.S. patent application Ser. No.

11/694,675 entitled "Method and System for Selecting and Displaying Items", having the same filing date as the present application and is incorporated herein by reference in its entirety. However, the scope of the present disclosure is not limited in this regard as the system and method of the present disclosure can be utilized in connection with any items list or any other grouping or list having any types of items, such as a list of items in a shopping cart, on a wish list, or any other type of items list in any format, including text and/or images, or any other format. Further the present disclosure may be used with an individual item not in a list.

Figure 3:
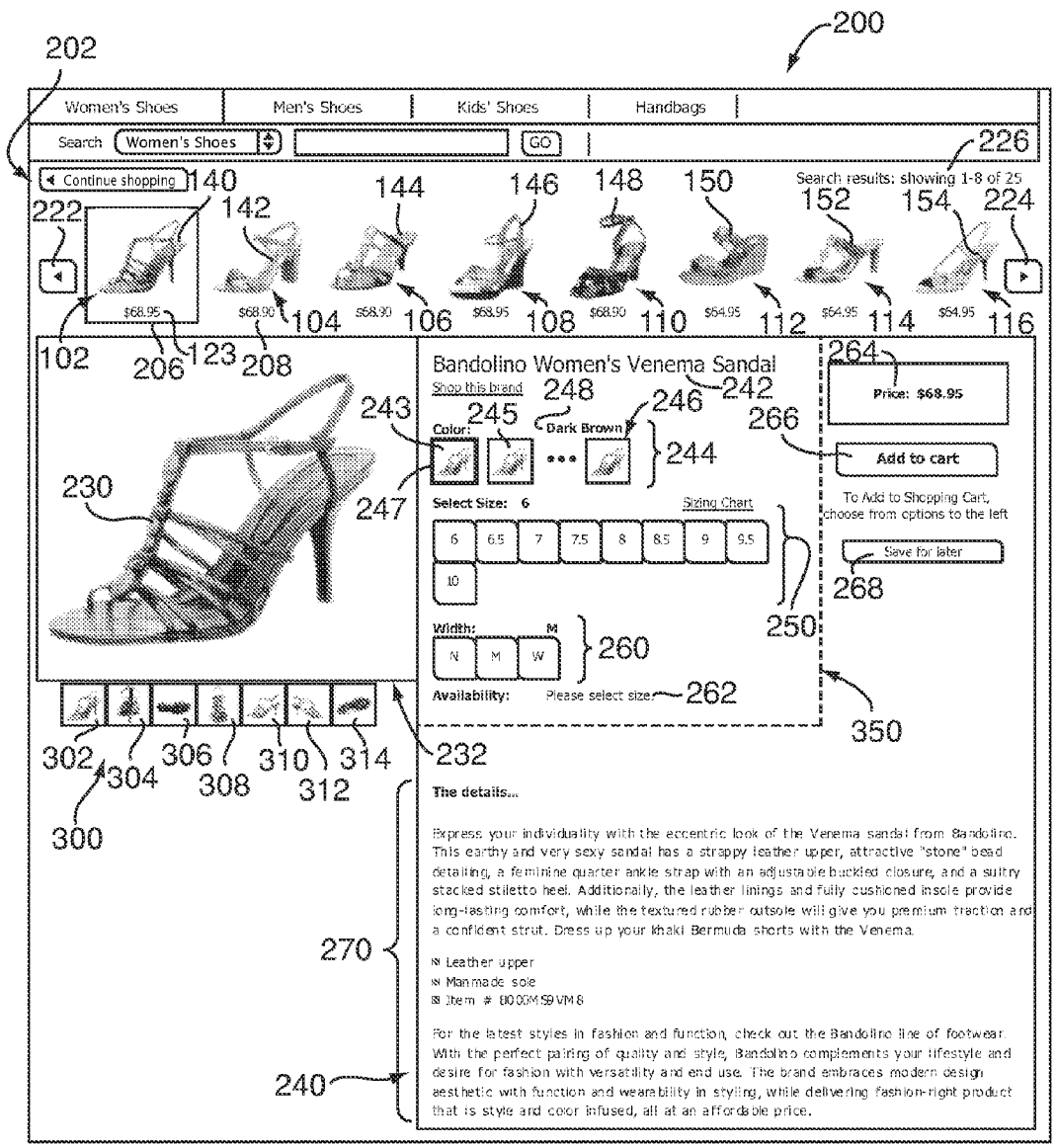
FIG. 3 is a screen illustration of a zoom detail window, in accordance with embodiments of the present disclosure.

Referring to FIG. 3, when the customer 10 selects (or clicks on) one of the items 102-132 in the list 100 (FIG. 2), e.g., the first item 102, a Bandolino Venema Sandal, a zoom detail window or screen 200 appears. The zoom detail screen 200 includes a large image view window or screen section 232, a plurality of small thumbnail image views (or image view icons or view icons) 300, and an item (or product) detail window 240. In addition, an optional slide show viewer (or slider) window or screen section 202 may also be displayed which allows the customer 10 to select other items from the list 100 without having to leave the web page, such as is described in U.S. patent application Ser. No. 11/694,597 entitled "Method and System for Selecting and Displaying Items", having the same filing date as the present application and is incorporated herein by reference in its entirety (discussed more hereinafter).

In the large image view section 232 on the screen 200 is a large image 230 of the selected item 102. Below the large image view section 232 are the view icons 302-314 (collectively, numeral 300), each indicative of a different view of the item 102. For example, the view icon 302 is a right side elevated perspective view, shown as the large image 230 in the large image section 232. Also, the view icon 304 is a back view of the item 102, the view icon 306 is a bottom view of the item 102, the view icon 308 is a front view of the item 102, the view icon 310 is a right side view of the item 102, the view icon 312 is a left side view of the item 102, and the view icon 314 is a top view of the item 102.

When the customer 10 mouses over (or selects) one of the view icons 302-314, the associated image is displayed as a large image in the large image view section 232. Thus, the customer 10 may sequentially view a plurality of different views of the item 102 prior to purchase on the same browser screen using the "mouse-over" feature (thus, no new browser screen is generated for each different view displayed). Although there are seven view icons 302-314 shown in the embodiment of FIG. 3, any number of view icons 300 may be used and the view icons 300 may be displayed in any order. The mouse-over selection of the view icons 300 allows the customer 10 to easily change views by moving the mouse across the icons 300. Instead of or in addition to mousing over the view icons 300 to select the large image view in the section 232, the customer 10 may select a view by clicking on the corresponding icon 300.

Figure 4:
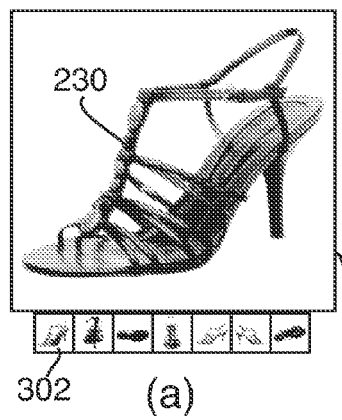
FIG. 4, illustrations (a)-(g), show various different image views of an item, in accordance with embodiments of the present disclosure.
Figure 4:
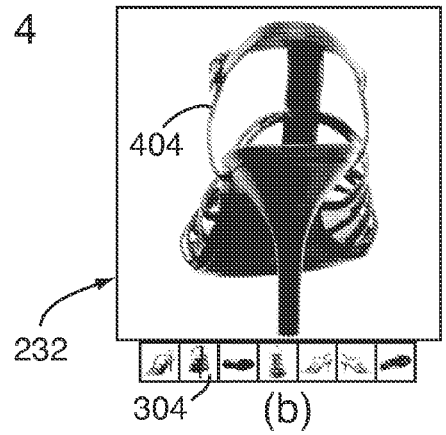
Figure 4:
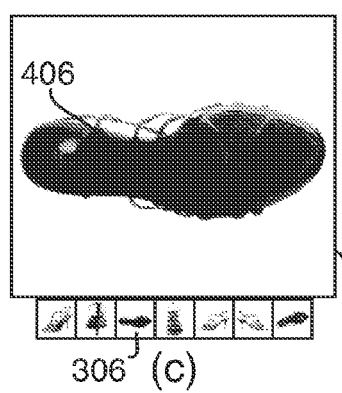
Figure 4:
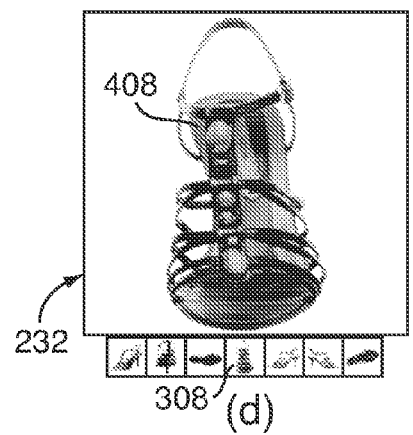
Figure 4:
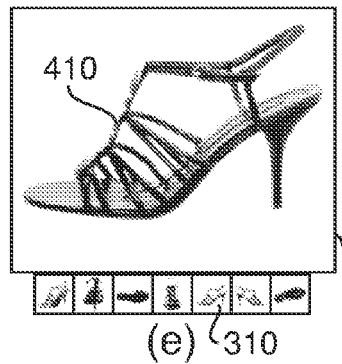
Figure 4:
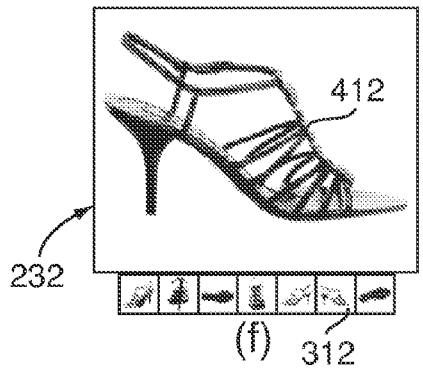
Figure 4:
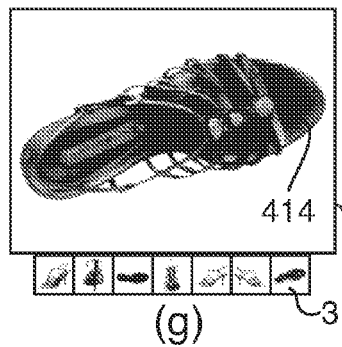

Referring to FIG. 4, illustrations (a)-(g), more specifically, each of the view icons 302-314 are shown having the large images 230,404-414, respectively, as the large image in the large image section 232. In particular, FIG. 4, illustration (a) shows the image 230 as the large image if a right side perspective view of the item 102 corresponding to the view icon 302; illustration (b) shows a large image 404 of a back view of the item 102 corresponding to the view icon 304; illustration (c) shows a large image 406 of a bottom view of the item 102 corresponding to the view icon 306; illustration (d) shows a large image 408 of a front view of the item 102 corresponding to the view icon 308; illustration (e) shows of an image 410 of a right side view of the item 102 corresponding to the view icon 310; illustration (f) shows an image 412 of a left side view of the item 102 corresponding to the view icon 312; and illustration (g) shows an image 414 of a top view of the item 102 corresponding to the view icon 314.

Referring again to FIG. 3, to the right of the large image view screen section 232 is the item (or product) detail window or screen section 240 having a header or title 242 with the name of the selected item 102, in this example, "Bandolino Women's Venema Sandal". The section 240 contains predetermined detail information about the selected item 102. In particular, there may be a color selector 244, a size selector 250, a width selector 260. The color selector 244, the size selector 250 and the width selector 260 may provide an interactive attribute selection and availability feature or tool for displaying available colors, sizes and widths, for the selected item 102, as is described in detail in U.S. patent application Ser. No. 11/694,597 entitled "Method and System for Selecting and Displaying Items", having the same filing date as the present application and is incorporated herein by reference in its entirety. When the customer 10 selects an attribute in one of the selectors 244,250,260, the other selectors are all automatically updated to indicate the availability of their respective attributes based on the selected attribute, as is discussed in the aforementioned patent application. Further, selectors 244,250,260 and the availability indicator 262 may be located within a zoom window or screen section 250 (discussed more hereinafter) within the items details section 240. Also, the item details section 240 may have an availability field 262 indicative of the availability of the selected item 102 based on attributes selected in the selectors 244,250,260.

In addition, the section 240 may have a price field 264, displaying the current price or sale price of the item; an "add to cart" button 266, that allows the customer 10 to add the item 102 to the shopping cart; and/or a "save for later" button 268 that allows the customer 10 to save the information on the current screen for later use. Also, the section 240 may have a section 270 labeled "The details.", which provides a narrative description of the item and some item features, attributes, characteristics, and suggestions of the selected item 102 that may be of interest to the customer 10. Other item details, attributes, features, characteristics, marketing information, and/or specifications may be included in the item details screen 240.

When the selected item 102 can be purchased in different colors, the item detail window 240 may provide an interactive item color viewing feature that allows the customer 10 to view a large view of the selected item in the selected color. In particular, if the shoe 102 is available in a plurality of colors, the color selector 244, may have color item thumbnail images (or color icons or color selectors) 246, one for each of the available colors for the item 102. When the customer 10 selects (mouses over or clicks on) one of the color icons 246, a color description 248 appears, e.g., dark brown, black, yellow, dark red leather, black fabric, etc., describing the color and/or the material or "feel" of the item.

For example, if the customer 10 mouses over the color icon 243, e.g., indicative of the color dark brown, the color field 248 shows "dark brown" as the color, and the image 230 in the large image view section 232 becomes an image of the item 102 in the color dark brown. When the customer 10 mouses over the next color icon 245, indicative of the color black, the color field 248 shows "black" as the color, and the image 230 in the large image view section 232 becomes an image of the item 102 in the color black. A similar process is performed for any of the color icons 246 in the color selector 244.

Also, if the customer 10 clicks on one of the color icons 244, e.g., the icon 243, a dark box 247 appears around the corresponding color icon 244, the large image 230 "locks" (or becomes fixed) with that color image when the mouse is moved away from the color icons, and the view icons 300 update to provide view icons 300 for the selected color. The customer 10 can then mouse over the icons 300 and view various different views of the large image 230 in the section 232 of the selected item 102 in the selected color. Thus, the customer 10 can easily view various views of large images of the shoe in a selected color in the section 232 to assist in purchasing the proper color shoe. This color viewing feature may apply to any item sold by the merchant and desired to be used by the customer.

It should be understood that for any of the embodiments herein, when an image (or icon) in the zoom detail screen 200 is selected, e.g., the view icons 300, the item detail screen 204 icons, or anywhere else in the zoom detail screen 200, the screen may be updated to display the associated image with a box, an outline, a color, shading, shadow, or some type of highlighting, mark, or indicia, so that the selected status thereof is distinguishable from the icons that have not been selected. Also, the view icons 300 and the color icons 246 may be small thumbnail images of the selected item or may be other graphical or text icons, buttons, or selectors indicative of the function to be performed.

The interactive interface for the color, size and width attributes described hereinbefore is similar to that described in U.S. patent application Ser. No. 11/617,998, Filed Dec. 29, 2006, entitled "Methods and Systems for Selecting Item Variations for Display In User Interfaces", which is incorporated herein by reference in its entirety.

Figure 5:
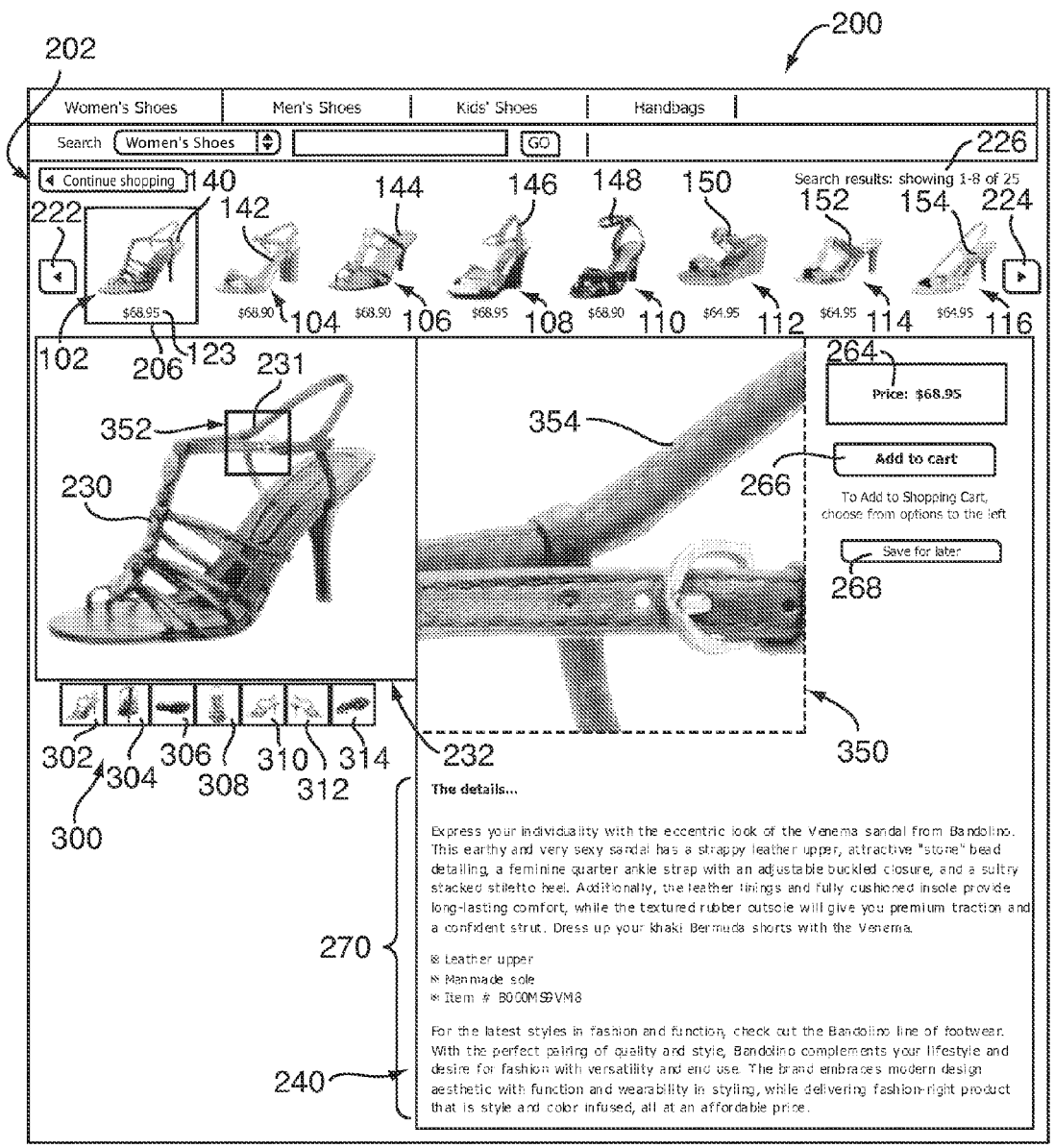
FIG. 5 is a screen illustration of another zoom detail window showing a magnified image section, in accordance with embodiments of the present disclosure.

Referring to FIG. 5, if the customer 10 moves the mouse cursor over (or mouses over) the large image 230 in the large image view section 232, a zoom box 352 appears over a portion of the image 230 around where the mouse cursor is located. At the same time, the magnified image screen or window 350 in the item details section 240, displays a magnified (or enlarged) image 354 of the image within the zoom box 352. In the example of FIG. 5, the zoom box 352 is over the buckle and a portion of the upper strap of the shoe image 230. The magnification (or enlargement) from the image 231 in the zoom box 352 to the magnified image 354 in the magnified image screen or window 350 is determined as discussed hereinafter with FIG. 9. However, any magnification can be used that displays the magnified image 352 in the magnified image screen 350 larger than the image 231 in the zoom box 352.

Figure 9:
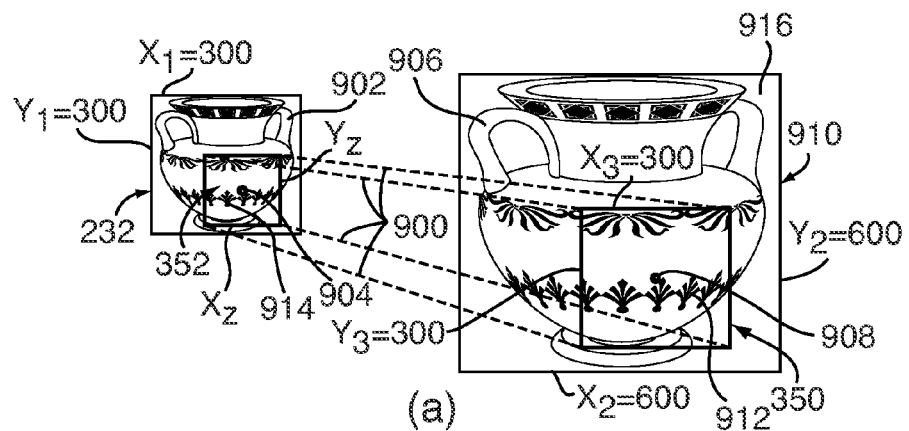
FIG. 9, illustrations (a)-(c), shows various different high resolution image sizes and corresponding zoom box sizes, in accordance with embodiments of the present disclosure.
Figure 9:
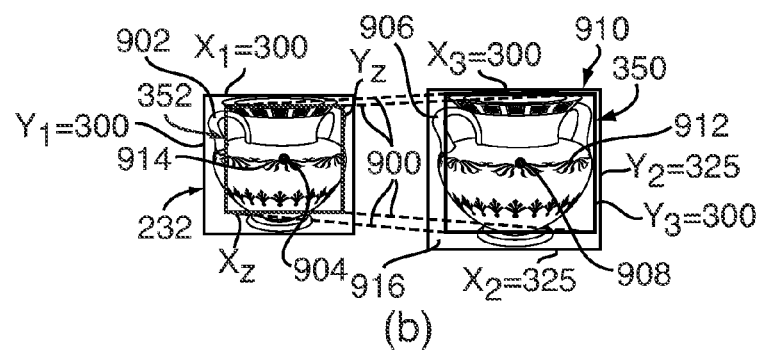
Figure 9:
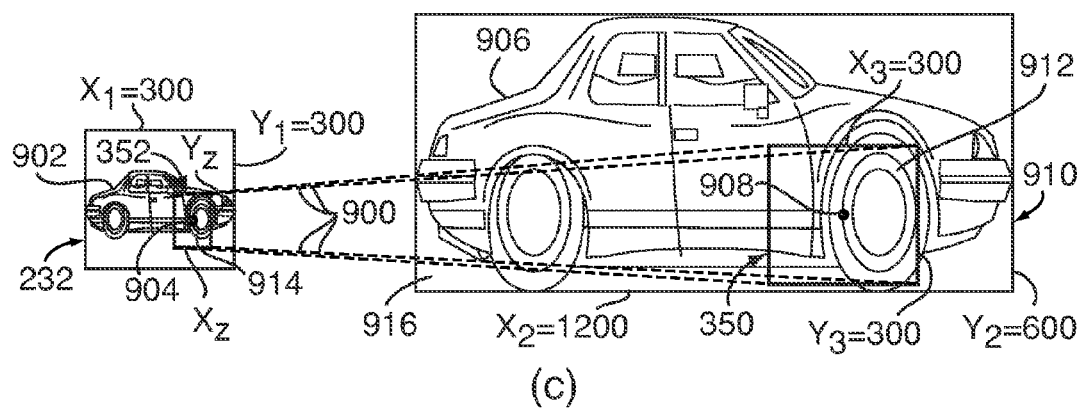

Referring to FIG. 9, illustrations (a)-(c), the magnified image 354 (FIG. 5) within the magnified image window (or zoom image screen) 350 may be formed by displaying a portion 912 (FIG. 9) of a second high resolution image 906 in the large image view window 232. In particular, referring to FIG. 9, illustration (a), the image view window 232 may have a low resolution image 902. The dimensions of the view window 352 are X1 by Y1, e.g., 300 pixels by 300 pixels. Also, there is a high resolution image 906 that has an image frame 910 having dimensions X2 by Y2, e.g., 600 pixels by 600 pixels. In such a case, when the customer 10 mouses over the image 902 in the window 232, a mouse cursor location is used as a reference point for the center 904 of the zoom box 352. For example, in some embodiments, the mouse cursor location defines the center point 904 of the zoom box 352; however, the mouse cursor location may define any other reference point for the zoom box and, thus, may be located at a corner of the zoom box 352 or even outside of the zoom box 352, among many other possibilities. The location of the center point 904 of the zoom box 352 is mapped onto a corresponding point 908 on the high resolution image 906. This mapping may be done by knowing the x,y location of the mouse cursor with respect to the center point 904 within the window 232, the size of the window 232, e.g., 300×300 pixels, and the size of the high resolution image frame 910, e.g., 600×600 pixels. The corresponding location 908 of the center point 904 in the high resolution image 906 can then be determined, e.g., by calculating the percentage along the x and y dimensions that the center point 904 is located within the view window 232 and applying these percentages to the corresponding x,y dimensions of the frame 910 to locate the corresponding point 908 within the frame 910 for the image 906. Other techniques may be used to determine the location of the point 908. The points 904,908 may be called "anchor points" or "reference points" as they are the points from which the boxes 352,350 are derived.

Once the location of the anchor point 908 on the high resolution image is determined, a portion 912 of the image 906 for the magnified image window 350 is identified based on the dimensions X3,Y3 of the window 350, e.g., 300×300 pixels. Thus, in that case, the window 350 would be the portion 912 of the image 906 that is defined by a box which is 150 pixels up, down, left, and right of the anchor point 908 for the image data. The aspect ratio of the dimensions of the high resolution image frame 910 to the dimensions of the magnified image window 350, when applied to the dimensions of the image view window 232, determines the dimensions Xz,Yz of the zoom box 352. For example, in that case, the horizontal (X) aspect ratio may be calculated as X3/X2=300/600=0.5, and the vertical (Y) aspect ratio may be calculated as Y3/Y2=300/600=0.5. Applying this aspect ratio to the dimensions X1,Y1 of the image view window 232, provides the zoom box 352 dimensions Xz,Yz of: Xz=X1*0.5=300*0.5=150 pixels; and Yz=Y1*0.5=300*0.5=150 pixels, centered around the point 904. Thus, the zoom box 352 dimensions Xz,Yz are such that the portion 914 of the image 902 within the zoom box 352 is indicative of the portion 912 of the high resolution image 906 in the magnified image window 350.

Referring to FIG. 9, illustration (b), if the dimensions of the high resolution image frame 910 are only slightly larger than the magnified image window 350, e.g., X2=325, Y2=325 and X1=300, Y1=300 pixels, the size of the zoom box 352 is calculated to be a relatively large portion of the image view window 232. For example, in such a case, the horizontal (X) aspect ratio is X3/X2=300/325=0.923 and the vertical (Y) aspect ratio is Y3/Y2=300/325=0.923. Applying this aspect ratio to the dimensions X1,Y1 of the image view window 232 provides the zoom box 352 dimensions Xz,Yz of: Xz=X1*0.923=300*0.923=277 pixels (rounded to the nearest pixel); and Yz=Y1*0.923=300*0.923=277 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. Thus, because the aspect ratios are close to 1, the zoom box is a large portion of the view window 232.

Referring to FIG. 9, illustration (c), if the horizontal and vertical dimensions X2,Y2 of the high resolution image frame 910 are not the same value, e.g., X2=1200, Y2=600 pixels (a rectangle instead of a square), the dimensions Xz,Yz of the zoom box 352 will adjust accordingly. For example, in such a case, the horizontal (X) aspect ratio is X3/X2=300/1200=0.25 and the vertical (Y) aspect ratio is Y3/Y2=300/600=0.5. Applying this aspect ratio to the dimensions X1,Y1 of the image view window 232, provides the zoom box 352 dimensions Xz,Yz of: Xz=X1*0.25=300*0.25=75 pixels (rounded to the nearest pixel); and Yz=Y1*0.5=300*0.5=150 pixels (rounded to the nearest pixel). Thus, the zoom box 352 dimensions Xz,Yz are again set such that the portion 914 of the image 902 within the zoom box 352 is indicative of the portion 912 of the high resolution image 906 in the magnified image window 350. In this example, the high resolution image 906 is a rectangular shape because the image 906 that shape maximized the amount of the image in the frame 910. Thus, the zoom box in this example, is a corresponding rectangular shape based on the aspect ratios.

Therefore, the dimensions Xz,Yz of the zoom box 352 may be determined using the following equations:

$$Xz = X1(X3/X2) \quad \text{Eq. 1}$$

$$Yz = Y1(Y3/Y2) \quad \text{Eq. 2}$$

where X1,Y1 are the dimensions of the large image window 232, X2,Y2 are the dimensions of the high resolution image frame 910 (or the outer dimensions of the high resolution image 906), and X3,Y3 are the dimensions of the magnified image window 350. Other equations may be used provided the zoom box size is set based on the aspect ratio of the high resolution image 906 to the magnified image window 350.

It should be understood that the high resolution image may be a cropped image, e.g., the frame 910 around the high resolution image 906 may be as close as possible to the outer edges of the image 906 in both the X and Y dimensions to minimize the amount of blank space 916 in the high resolution image 906. This minimizes the magnification of unnecessary aspects of the image and maximizes the image resolution for a given set of pixel dimensions. In addition, this zoom technique automatically adjusts for different aspect ratios between the high resolution image frame 910 and the magnified image window 350. Further, the anchor points 904,908 from which the boxes 352,350 are derived, respectively, need not be in the center of the boxes 352,350, but may be any located anywhere in the window frames 232,910, provided the boxes 352,350 can be formed on their respective images 902,906 therefrom. Also, it should be understood that the dimensions of the magnified image window 350 and the zoom box 352 may be any values and the shape need not be square, and the technique discussed herein will adjust accordingly to the shape and size of same.

Figure 6:
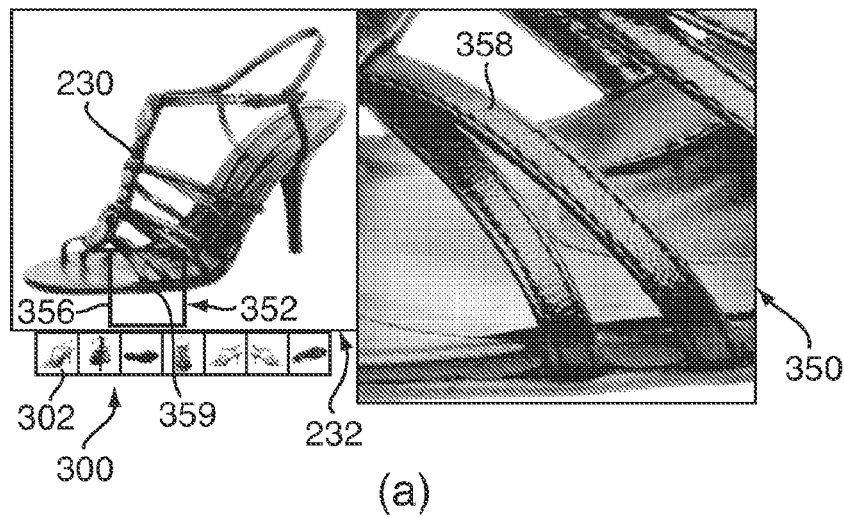
FIG. 6, illustrations (a)-(c), show various different image views of an item with selected magnified image section, in accordance with embodiments of the present disclosure.
Figure 6:
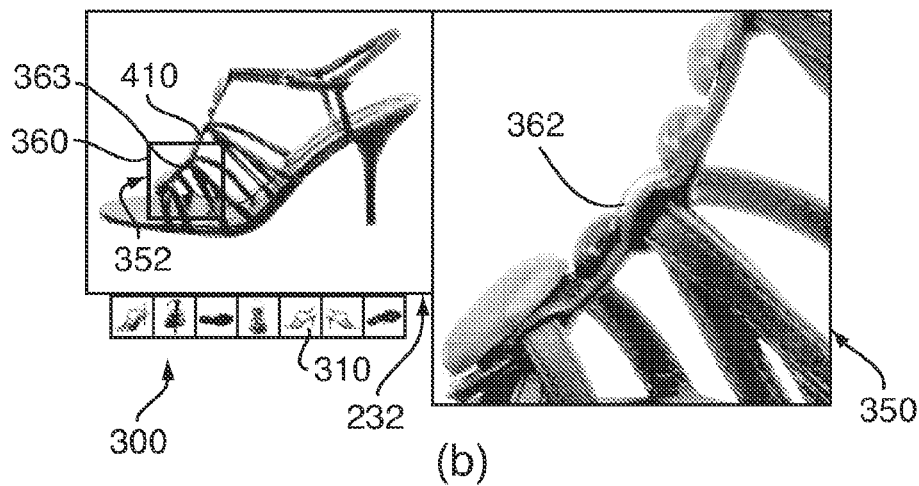
Figure 6:
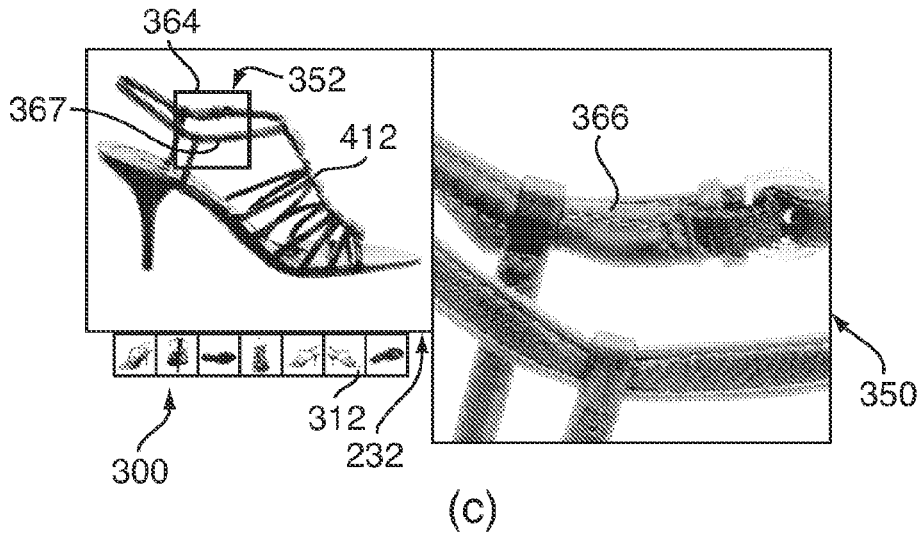

Referring to FIG. 6, illustration (a), when the customer 10 moves the mouse to a new position 356 on the image 230, the zoom box 352 moves to that location, and a new magnified image 358 of a new portion 359 of the image 230 in the zoom box 352 is displayed in the magnified image window 350. Referring to FIG. 6, illustration (b), when the customer 10 mouses over the view icon 310 (right side view), an image 410 appears in the large view section 232 without further selection of the view icon 310 by the customer 10 (e.g., no mouse click is required). When the customer 10 moves the mouse cursor from the view icon 310 to a position 360 on the image 410, the zoom box 352 appears and moves to that position, and a magnified image 362 of a portion 363 of the image 410 within the zoom box 352 is displayed in the magnified image window 350. Referring to FIG. 6, illustration (c), when the customer 10 next mouses over the view icon 312 (left side view), an image 412 appears in the large view section 232 without further selection of the view icon 312 by the customer 10. When the customer 10 moves the mouse cursor from view icon 312 to a position 364 on the image 412, the zoom box 352 appears and is moved to that location, and a magnified image 366 of a portion 367 of the image 412 within the zoom box 352 is displayed in the magnified image window 350. Similarly, according to some embodiments, as the customer 10 moves the mouse cursor across the view icons 302-314, the corresponding image 412 dynamically updates to show the view represented by the respective icon 302-314 that the mouse cursor is over at that time.

Also, the zoom box 352 and magnified image screen 350 also work with the color view feature discussed hereinbefore with FIG. 3. As discussed hereinbefore, when a color has been selected (clicked on), the large image 230 in the large image view section 232 is updated (and locked) to show the item in the selected color, and the view icons 300 update to show the image views in the selected color. The customer 10 can then mouse over the color-selected image and the zoom box 352 will appear, the magnified image section 350 will appear, and the customer 10 can view zoomed details of the color-selected image for the selected view in the selected color.

Furthermore, for any of the embodiments described herein whenever the screen is updated in response to a customer 10 action or selection/deselection, it may be updated such that a new window (or screen section) is displayed within a currently displayed HTML (Hyper Text Markup Language) page, web page, or browser screen (and, thus, no new HTML page, web page, or browser screen is generated). This is to be distinguished from other conventional techniques, where new HTML pages open up over an existing page when a feature, attribute, or icon is selected by the user.

Referring again to FIG. 3, as discussed hereinbefore, the slide show viewer (or slider) 202 may be used in the display screen 200 to allow the customer 10 to select items from the list 100 without having to leave the web page, as is described in detail in U.S. patent application Ser. No. 11/694,597 entitled "Method and System for Selecting and Displaying Items", having the same filing date as the present application and is incorporated herein by reference in its entirety.

In particular, the slider section 202 displays a series of eight adjacent thumbnail item images 140-154 in eight corresponding adjacent locations indicative of the first eight items 102-116 in the list 100 (FIG. 3), respectively. However, the slider 202 may display any number of images desired. Also, the slider may display images corresponding to any of the items on the list 100. In addition, there may be certain of the item details information 123 displayed with each of the item images 140-154. Further, the selected item 102 has a box 204 around it in the slider 202 to indicate it is selected.

If there are more than the predetermined maximum number of images, e.g., eight, in the slider 202 (e.g., there are more than eight recommended items in the list 100), left and right scroll arrow buttons 222,224, respectively, appear. The maximum number of images in the slider 202 may be any desired number, depending in part on the size of the images 140-154 and the size of the browser screen. When the customer 10 selects (clicks on or mouses over) the left scroll arrow button 222, the images 140-154 (and the associated item details 123) all scroll (or index or shift) to adjacent positions to the right. Similarly, if the customer 10 clicks on the right scroll button 224, the images 140-154 (together with the associated item summaries 123) all scroll (or index or move) to the adjacent positions to the left.

The scroll type for the slider 202 may be an index-type scroll, where there are preset positions for each image in the slider 202, or a smooth or continuous-type scroll, where there are no fixed positions for the images 140-154 in the slider 202, and the images 140-154 scroll smoothly as a group across the slider screen 202 in the desired direction based on the selection of the scroll buttons 222,224. Also, if there are more than the predetermined maximum number of images in the slider 202, a "search results" summary status 226 of which items are displayed in the slider 202 is provided.

Figure 7:
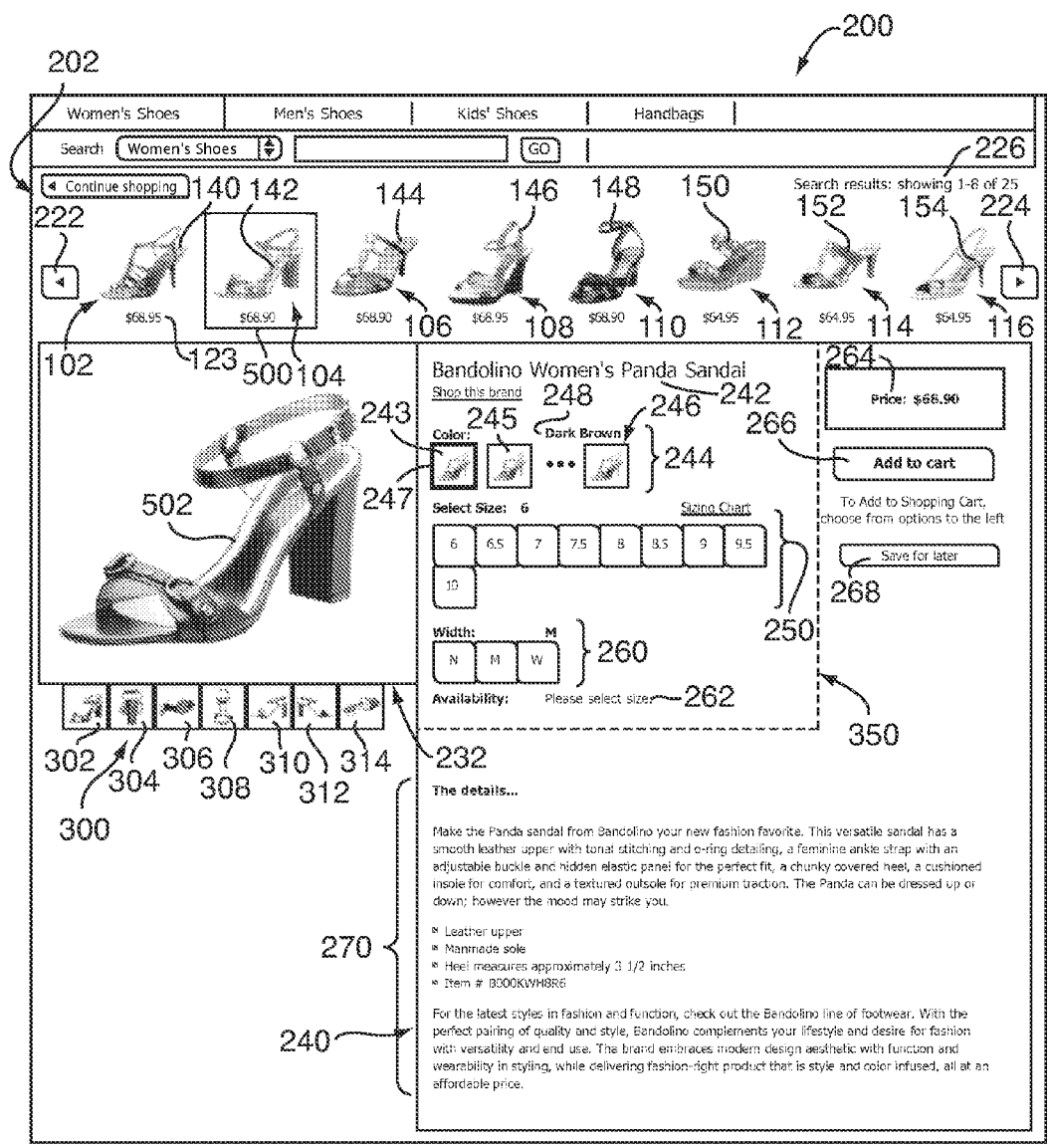
FIG. 7 is a screen illustration of another zoom detail window showing selection of another item, in accordance with embodiments of the present disclosure.

Referring to FIG. 7, when the customer desires to view another item 104 on the list 100, the customer 10 may go back to the screen 90 (FIG. 2) and select the item 104 from the list 100 which will bring the customer 10 to the screen 200. However, if the slider 202 is used, the customer 10 can click on a corresponding image 122 in the slider 202, causing the box 206 (FIG. 3) around the item 102 to disappear and a new box 500 to appear around the selected image 142. In either case, the large image view section 232 is updated to display a large image 502 of the newly selected item 104, and the view icons 300 are updated to show available views for the newly selected item 104. In addition, the item detail section 240 is updated to display details of the item 104. With the item 104 selected, the customer 10 may zoom in on the large image 502 or a large view corresponding to any of the icon views 300 for that item 104 as discussed hereinbefore with FIG. 5 for the item 102.

Figure 8:
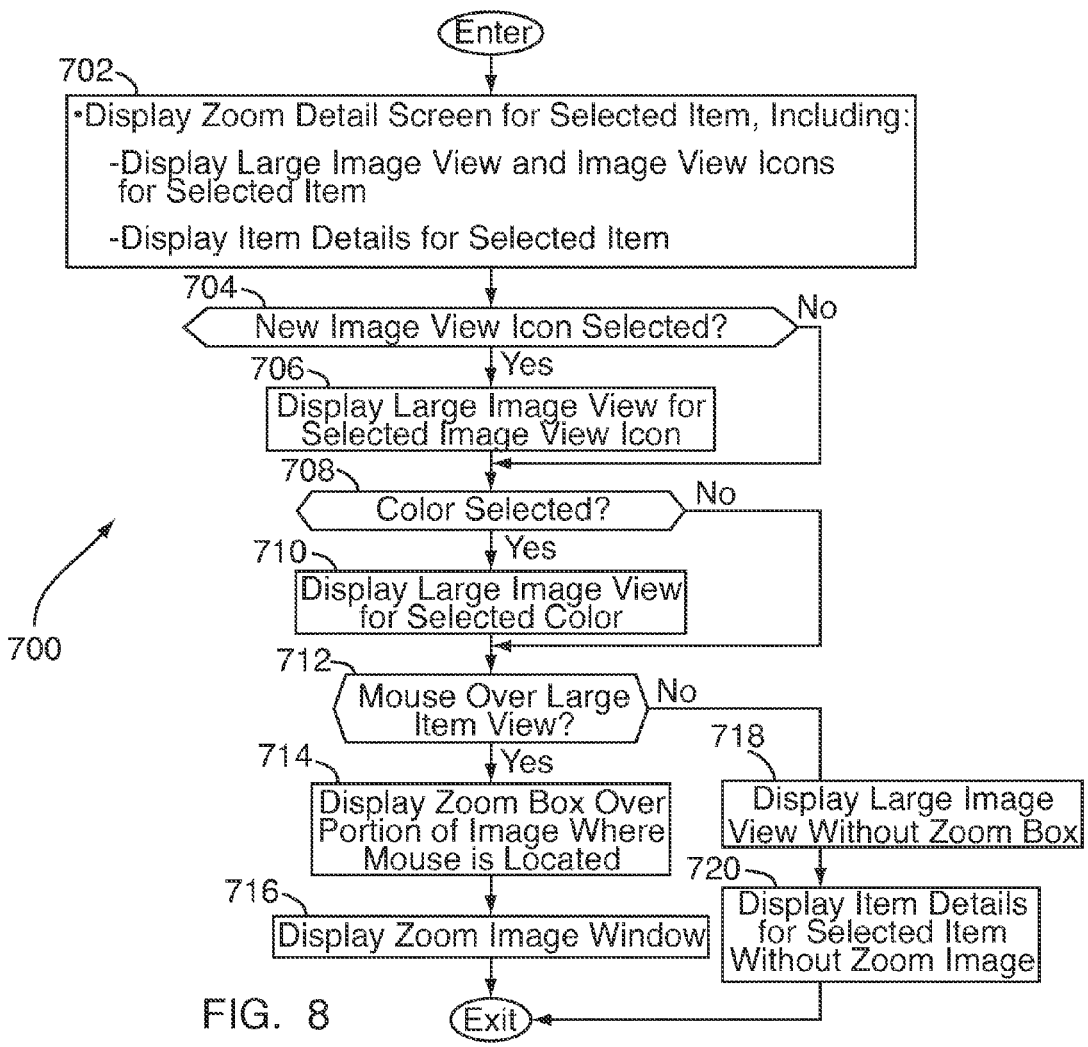
FIG. 8 is a flow chart of a zoom detail window display process, in accordance with embodiments of the present disclosure.

Referring to FIG. 8, a process 700 for providing the zoom detail window user interface disclosed herein begins at block 702, which displays the sections of the zoom detail window 200 for the selected item, including displaying the large image view section 232, displaying the view icons 300, and displaying the item details 240 for the selected item. Next, block 704 determines whether a new one of the view icon 300 has been selected. If YES, block 706 displays a large image for the selected image icon 300 in the large image view section 232. After the block 706 or if the result of the block 704 is NO, a step 708 determines if the customer 10 has selected one of the color icons 246 in the item details section 240. If YES, block 710 displays a large 230 image of the selected item in the large image view section 232 having the selected color. After the block 710 or if the result of block 708 is NO, block 712 determines if the customer 10 has moused over the large item view section 232. If YES, block 714 displays the zoom box 252 (FIG. 3) and a block 716 displays the magnified image 254 in the zoom screen section 350 and then the process exits. If the result of the block 712 is NO, block 718 displays the large image view without the zoom box and block 720 displays the portion of the full item details section without the magnified image window 350.

It should be understood that the screen 200 may be reached by selecting on any item or image on the merchant web site that would bring the customer 10 to an item (or product) details page. Thus, the item need not be selected from a list (or group, or set, or collection), but may be a stand alone item on the merchant web site.

It should be understood that it is not important for the present disclosure how the customer 10 actually purchases or otherwise obtain the desired item. For example, the desired item may be obtained by the customer 10 using the computer 14 and the network 18 or off-line without the use of the computer 14 or network 18, e.g., via telephone, fax, mail, in person, CD, or DVD, or the like.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

At least the following is claimed:

1. A method, comprising:
   causing a display of a screen having a plurality of screen sections, comprising:
   a large image section having a large image of a view of an item,
   a zoom box disposed over at least a portion of the large image in response to a mouse-over selection of the portion of the large image, and
   a magnified image section having a predetermined portion of a high-resolution image having dimensions $X_2, Y_2$,
   wherein the magnified image section has dimensions $X_3, Y_3$,
   wherein the large image section having dimensions $X_1, Y_1$,
   wherein the zoom box having dimensions $X_z, Y_z$, and
   wherein the predetermined portion of the high-resolution image is larger than the portion of the large image by a predetermined magnification amount; and
   determining a size of the zoom box by the equations: $X_z = X_1(X_3/X_2)$ and $Y_z = Y_1(Y_3/Y_2)$.

2. A method comprising:
   causing a display of a large image of a view of a selected item, wherein the view corresponds to a selected one of a plurality of view icons;
   causing a display of a zoom box over at least a portion of the large image in response to a selection of at least a portion of the large image, wherein the portion of the large image within the zoom box is a zoom box image;
   causing a display of a portion of a high-resolution image, wherein the high-resolution image corresponds to the large image, and wherein the high-resolution image is larger than the zoom box image,
   wherein the high-resolution image is not generated by a magnification of the zoom box image, and wherein the zoom box has dimensions that are determined based at least in part on at least one of a dimension of the high-resolution image, a dimension of the portion of the high-resolution image and a dimension of the large image.

3. The method of claim 2, wherein the high-resolution image has dimensions X2,Y2,
wherein the portion of the high-resolution image has dimensions X3,Y3,
wherein the large image has dimensions X1,Y1, and
wherein the zoom box has dimensions Xz,Yz, and
wherein the method further comprises:
determining a size of the zoom box according to the equations: $Xz=X1(X3/X2)$ and $Yz=Y1(Y3/Y2)$.

4. The method of claim 2, further comprising:
causing a display of an updated view of the large image in response to a selection of another one of the view icons,
wherein the large image of the view of the selected item is displayed in a first location on a first browser screen, and
wherein the updated view is displayed in the first location on the first browser screen.

5. The method of claim 2, wherein the portion of the high-resolution image is larger than the zoom box image by a predetermined magnification amount.

6. The method of claim 2, wherein the selection of at least the portion of the large image comprises a mouse-over selection.

7. The method of claim 2, further comprising:
changing the view of the large image in response to a selection of another one of the view icons.

8. The method of claim 2, further comprising:
changing a location of the zoom box in response to a position of a mouse cursor.

9. The method of claim 2, wherein the box and the portion of the high-resolution image disappear when no portion of the large image is selected.

10. The method of claim 2, wherein the large image has a color indicative of a selected color icon.

11. The method of claim 2, further comprising:
causing a display of predetermined item details about the selected item.

12. The method of claim 11, wherein the portion of the high-resolution image is displayed over at least a portion of the item details, thereby blocking the display of at least the portion of the item details.

13. The method of claim 12, wherein the zoom box and the portion of the high-resolution image disappear when no portion of the large image is selected.

14. The method of claim 11, wherein the item details section comprises a plurality of color icons, and
wherein the method further comprises:
accepting a selection of one of the color icons as a selected color icon.

15. The method of claim 14, wherein the large view has a color corresponding to the selected color icon.

16. The method of claim 11, wherein the item details section comprises at least one of a plurality of color icons, a plurality of size icons or a plurality of width icons.

17. The method of claim 16, further comprising:
automatically updating at least one of the color icons, the size icons or the width icons to indicate an availability of the selected item in response to a selection of the at least one of the color icons, the size icons or the width icons.

18. The method of claim 2, further comprising:
causing a display of a slide show viewer having at least two viewer images corresponding to at least two items, wherein one of the at least two items is the selected item; and
accepting a selection of one of the viewer images corresponding to the selected item.

19. The method of claim 18, further comprising:
allowing a purchase of at least one item associated with the selected one of the viewer images in the slide show viewer.

20. The method of claim 2, wherein the selected item comprises at least one of a shoe or a handbag.

21. A method, comprising:
causing a display of a plurality of view icons, wherein each of the view icons is indicative of a different view of an item;
accepting a selection of at least one of the view icons as a selected view icon;
causing a display of a large image of a view of the item corresponding to the selected view icon;
causing a display of a zoom box over at least a portion of the large image in response to a selection of the portion of the large image;
causing a display of a predetermined portion of a high-resolution image corresponding to the portion of the large image, wherein the predetermined portion being larger than the portion of the large image; and
changing the view of the item in response to a change in the selected view icon,
wherein the changing comprises causing the display of an updated view of the large image in response to selection of another of the view icons, the updated view being on the same browser screen and in the same location as a prior view of the large image, and
wherein dimensions of the zoom box are determined from dimensions of at least one of the high-resolution image, the predetermined portion of the high-resolution image or the large image.

22. The method of claim 21, wherein the high-resolution image has dimensions X2,Y2,
wherein the predetermined portion of the high-resolution image has dimensions X3,Y3,
wherein the large image has dimensions X1,Y1, and
wherein the zoom box has dimensions Xz,Yz, and
wherein the method further comprises:
determining a size of the zoom box by the equations: $Xz=X1(X3/X2)$ and $Yz=Y1(Y3/Y2)$.

23. The method of claim 21, wherein the predetermined portion of the high-resolution image is larger than the portion of the large image by a predetermined magnification amount.

24. The method of claim 21, wherein the selection comprises a mouse-over selection.

25. The method of claim 21, further comprising:
changing a location of the zoom box in response to a position of a mouse cursor.

26. The method of claim 21, wherein the zoom box and the predetermined portion of the high-resolution image disappear when no portion of the large image is selected.

27. The method of claim 21, wherein the large image has a color indicative of a selected color icon.

28. The method of claim 21, further comprising:
causing a display of predetermined item details about the selected item.

29. The method of claim 28, wherein the predetermined portion of the high-resolution image is displayed over at least a portion of the item details.

30. The method of claim 21, further comprising:
causing the display of a slide show viewer having at least two viewer images, wherein each of the viewer images corresponds to an item, and wherein one of the viewer images corresponds to the selected item; and
accepting a selection of the one of the viewer images corresponding to the selected item.

31. The method of claim 21, wherein the selected item comprises at least one of a shoe or a handbag.

32. A non-transitory computer-readable medium having computer-executable instructions stored thereon,
wherein the instructions, when executed, cause a computer system having at least one computer processor to perform a method comprising:
causing a display of a large image of a view of a selected item;
causing a display of a zoom box over at least a portion of the large image in response to a selection of at least one of a plurality of view icons; and
causing a display of a predetermined portion of a high-resolution image corresponding to the zoom box image,
wherein the predetermined portion of the high-resolution image corresponding to the zoom box image is larger than the portion of the large image, and
wherein the zoom box has dimensions that are determined from at least one dimension of the high-resolution image, the predetermined portion of the high-resolution image and the large image.

33. The non-transitory computer-readable medium of claim 32, wherein said user interface causes the display to change said view of said large image in response to selection of another one of said view icons.

34. The non-transitory computer-readable medium of claim 32,
wherein the high-resolution image has dimensions $X2,Y2$,
wherein the predetermined portion of said high-resolution image has dimensions $X3,Y3$,
wherein the large image has dimensions $X1,Y1$, and
wherein the zoom box has dimensions $Xz,Yz$, and
wherein the method further comprises:
determining a size of the zoom box by the equations: $Xz=X1(X3/X2)$ and $Yz=Y1(Y3/Y2)$.

35. A method performed by a computer system, wherein the method comprises:
causing a display of a large image of a view of a selected item, wherein the view corresponds to a selected one of a plurality of view icons;
causing a display of a zoom box over at least a portion of the large image in response to a selection of at least the portion of the large image; and
causing a display of a predetermined portion of a high-resolution image corresponding to said portion of said large image, said predetermined portion being larger than said portion of said large image,
wherein the zoom box has dimensions that are determined from dimensions of the high-resolution image, the predetermined portion of the high-resolution image and the large image.

36. The method of claim 35,
wherein the high-resolution image has dimensions $X2,Y2$,
wherein the predetermined portion of the high-resolution image has dimensions $X3,Y3$,
wherein the large image has dimensions $X1,Y1$, and
wherein the zoom box has dimensions $Xz,Yz$, and
wherein the method further comprises:
determining the dimensions of the zoom box by the equations: $Xz=X1(X3/X2)$ and $Yz=Y1(Y3/Y2)$.

37. A computer system having a computer that executes a computer program which causes the display of information indicative of a plurality of items, the computer program causing the computer system to perform a method, comprising:
causing a display of a large image of a view of a selected item, said view corresponding to a selected one of a plurality of view icons;
causing a display of a zoom box over at least a portion of said large image in response to a selection of at least said portion of said large image; and
causing a display of a predetermined portion of a high-resolution image, said predetermined portion of said high-resolution image being larger than said portion of said large image,
wherein dimensions of the zoom box are determined based at least in part on dimensions of the high-resolution image, dimensions of the predetermined portion of the high-resolution image, and dimensions of the large image.

38. The method of claim 37, wherein the high-resolution image has dimensions $X2,Y2$,
wherein the predetermined portion of said high-resolution image has dimensions $X3,Y3$,
wherein the large image has dimensions $X1,Y1$, and
wherein the zoom box has dimensions $Xz,Yz$, and
wherein the method further comprises:
determining the dimensions of the zoom box by the equations: $Xz=X1(X3/X2)$ and $Yz=Y1(Y3/Y2)$.

* * * * *